US005923292A

United States Patent [19]

Dodd

[11] Patent Number: 5,923,292
[45] Date of Patent: Jul. 13, 1999

[54] DUAL ANTENNA NULL ELIMINATION

[75] Inventor: Robert W. Dodd, Palo Alto, Calif.

[73] Assignee: Space Systems/Loral, Inc., Palo Alto, Calif.

[21] Appl. No.: 08/891,484

[22] Filed: Jul. 11, 1997

[51] Int. Cl.[6] .............................. G01S 3/16; H04B 7/185; H01Q 3/22

[52] U.S. Cl. ............................ 342/383; 342/354; 342/372

[58] Field of Search ..................................... 342/383, 380, 342/372, 375, 352, 354

[56] References Cited

U.S. PATENT DOCUMENTS

| | | | |
|---|---|---|---|
| 3,134,896 | 5/1964 | Briggs | 342/378 |
| 3,568,197 | 3/1971 | Cubley | 342/354 |
| 4,298,873 | 11/1981 | Roberts | 342/375 |

*Primary Examiner*—Gregory C. Issing
*Attorney, Agent, or Firm*—Kenneth W. Float

[57] ABSTRACT

RF signal nulling and loss of RF lock (i.e., loss of a communications or command link) is resolved by changing the phase of signals derived from first and second (+Z and −Z) antennas so that they add in phase instead of canceling. This is accomplished automatically by using a computer or processor to measure the RF signal level output by a receiver and change the phase of the incoming signal using a phase shifter to achieve the highest level. A squelch circuit in the receiver is used to determine the maximum obtainable RF signal level. The squelch level is compared in a computer to a threshold when the system looks for a higher squelch level. The phase of the phase shifter is changed using a computer to maximize the received signal level. A feedback loop from the receiver through the computer to the phase shifter provides a path to shift the phase of the incoming RF signal in one of the paths so the respective signals add instead of cancel, which eliminates the signal nulling problem.

7 Claims, 3 Drawing Sheets

+Z
(Earth)
+X
(East)
-X
(West)
-Z
(Anti-Earth)
SPACECRAFT
10
11
12
110°
20°
50°

+Z
(Earth)
+Y
(South)
-Y
(North)
-Z
(Anti-Earth)
SPACECRAFT
10
11
12
50°

130°
50°
90°

+X
+Z
20°
Null

+Y
+Z
Null

30°
50°
70°

DUAL ANTENNA NULL ELIMINATION

BACKGROUND

The present invention relates generally to spacecraft, and more particularly, to a system that eliminates nulls created by summing signals derived from two broadbeam antennas on a spacecraft that point in different directions.

The telemetry, command and ranging (TC&R) antenna on many spacecraft is on the earth side of the spacecraft and a similar antenna is disposed on the opposite (anti-earth) side of the spacecraft, along the +Z and −Z axis. Typical spacecraft configurations apply the signal from both antennas to a single receiver through a coupler that normalizes signal levels from both antennas. The normal configuration involves the +Z antenna facing the earth so that the −Z antenna is completely masked by the spacecraft.

During orbit raising, and in a loss of lock scenario, the spacecraft can face in any direction. The incoming signal transitions from the +Z to the −Z antenna as the spacecraft rotates with respect to the earth. A problem occurs near the center (X/Y plane) where the spacecraft receives approximately equal signals from both antennas. The resulting signal has a "null" region. At the frequency of operation of the antennas, the wavelength is typically shorter than an inch. This means that the summing point for the +Z and −Z signals can add or subtract the signals depending on the exact orientation of the spacecraft. When two RF signals almost 180 degrees apart are added a strong signal is produced. However, when the signals subtract, the RF level is almost canceled (nulled out ) and the link to Earth is lost.

Previous approaches incorporate additional receivers with antennas having narrow beamwidths so that the signals can be combined at baseband. The baseband is sufficiently lower in frequency so that the nulling effect is not noticed. The prior approaches have also been less reliable as a result of assigning a different receiver to a signal shifted by 180 degrees.

Various approaches have been proposed to eliminate or ignore the antenna null. One approach involves constantly moving the spacecraft to assure that it will not be in a null situation for a significant period of time. This approach was determined to be undesirable since the same motion will put a good signal into a null. Another approach involves orienting the spacecraft so that the null will rarely face the earth, but this cannot be guaranteed during a loss of lock scenario.

Another solution involves switching the incoming signals between the two antennas. This solution sounds good until the reliability and failure modes are taken into consideration. A failure could lock the system on the wrong antenna and prohibit receiving a signal. This could be resolved by an additional receiver for each antenna which is quite expensive.

Therefore, it is an objective of the present invention to provide for a system that eliminates nulls created by two oppositely pointing antennas disposed on a spacecraft and thus eliminates loss of communication with and control of the spacecraft.

SUMMARY OF THE INVENTION

To meet the above and other objectives, the RF signal nulling and associated loss of RF lock (i.e., loss of the communications or command link) is resolved in accordance with the present invention by changing the phase of signals derived from first and second (+Z and −Z) antennas so that they add in phase instead of canceling. This is accomplished automatically by using a computer or processor to measure the RF signal level output by a receiver and change the phase of the incoming signal by means of a phase shifter to achieve the highest level. A squelch circuit in the receiver is used to determine the maximum obtainable RF signal level. The squelch level is compared in a computer onboard the spacecraft to a threshold level. When the system is below the threshold, it looks for a higher squelch level. The phase of the phase shifter is changed using a computer to maximize the received signal level. A feedback loop from the receiver through the computer to the phase shifter provides a path to shift the phase of the incoming RF signal in one of the paths so the respective signals add instead of cancel, which eliminates the signal nulling problem.

The present system incorporates an RF power monitor or a squelch circuit in the receiver that is coupled by way of a feedback loop through the computer to the RF phase shifter in one of the two paths (+Z or −Z) whose signals are combined and applied to the receiver. When the system detects low RF power or the squelch signal, the phase shifter is commanded by the computer to shift the phase to optimize the received power or maximize the squelch level. This function may be disabled when the spacecraft is on orbit and activated if there is a loss of lock. Other variations of this approach may be used to introduce a discrete phase shift of 180 degrees or 90 degree increments. This variation does not require a RF power monitor and may be implemented using a squelch signal produced by the squelch circuit.

The present invention eliminates telemetry, command and ranging antenna blackout null areas located in a 50 degree donut shaped pattern around a spacecraft using only +Z and −Z (first and second) antennas by combining RF signals derived from the antennas. The present invention provides for an increase in link margin by adding 6 dB (derived from coherently combining two signals) to currently available −4 dB antenna gain. The present invention provides improved RF performance and reliability (with respect to dropouts).

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figures 1A, 1B, 1C, 1D, 1E, 1F:
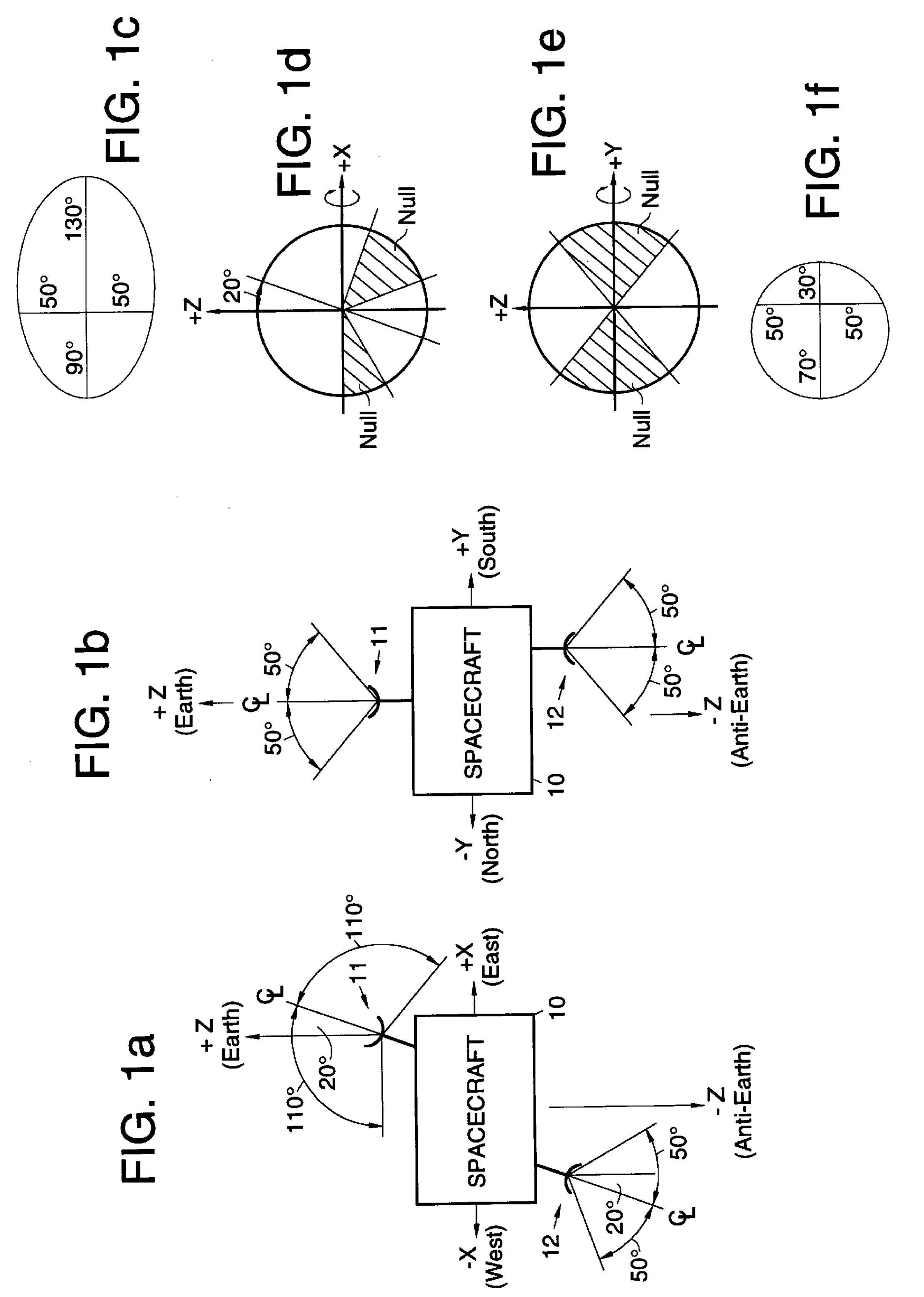
FIGS. 1*a* and 1*b* illustrate front and side views, respectively, of a spacecraft in which the present invention is implemented.
FIGS. 1*c*–1*f* illustrate antenna and null patterns produced by antennas on the spacecraft shown in FIGS. 1*a* and 1*b;*

Referring to the drawing figures, FIGS. 1*a* and 1*b* illustrate front and side views, respectively, of a spacecraft 10 comprising first and second (+Z and −Z) antennas 11, 12 that face the Earth and away from the Earth, respectively. More specifically, FIG. 1*a* shows the typical locations of the antennas 11, 12 relative to the XZ plane, while FIG. 1*b* shows the locations of the antennas 11, 12 relative to the YZ plane. The present invention may be implemented in such a spacecraft 10 in a manner described below.

By way of introduction, telemetry, command and ranging provisions on the spacecraft 10 incorporate multiple antennas to provide complete coverage during orbit raising. System simplification has reduced the number of antennas to two antennas 11, 12 located on the +Z and −Z axis. For reliability reasons, signals from the two (+Z and −Z) antennas are added in an RF section located prior to a receiver 15. Unfortunately, this creates a donut shaped pattern around the center of the spacecraft 10 between ±40 degrees from the Y axis in the YZ plane and a lopsided 30 to 50 degree area from the −X to the +X respectively in the XZ plane where the RF signals cancel periodically so that no signal or a significantly reduced signal is generated, resulting in a loss of command capability. The peak to peak separation between nulls occurs every 0.13 degrees change in the spacecraft 10 for a Ku-Band system.

Figure 3:
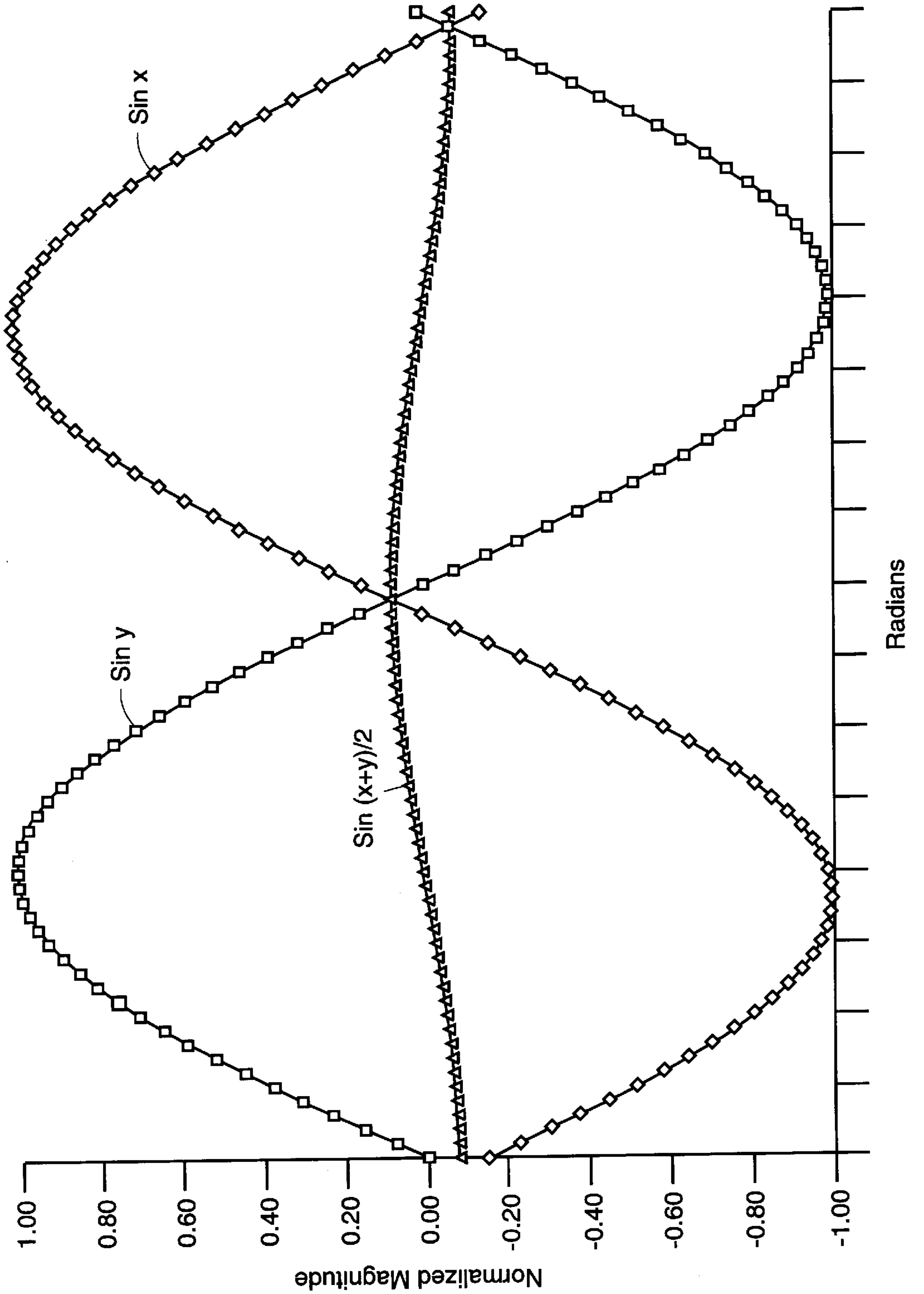
FIG. 3 is a graph of normalized magnitude versus angle in radians showing the null pattern that is eliminated by the present invention.

FIGS. 1*c*–1*f* illustrate the antenna and null patterns produced by the antennas 11, 12 shown in FIGS. 1*a* and 1*b* and discussed in the preceding paragraph. In particular, FIG. 1*c* shows the antenna pattern for the +Z antenna 11, and FIG. 1*f* shows the antenna pattern for the −Z antenna 12. FIG. 1*d* shows the null area relative to the XZ plane and FIG. 1*e* shows the null area relative to the YZ plane. The +Z antenna 11 has the broadest beam and the best coverage. The null area relative to the XZ plane was measured to be between 30 and 50 degrees and is shown in FIG. 1*d*. The null area relative to the YZ plane of ±40 degrees is shown in FIG. 1*e*. FIG. 3 is a graph of normalized magnitude versus angle in radians showing the null pattern that is eliminated by the present invention.

Figure 2:
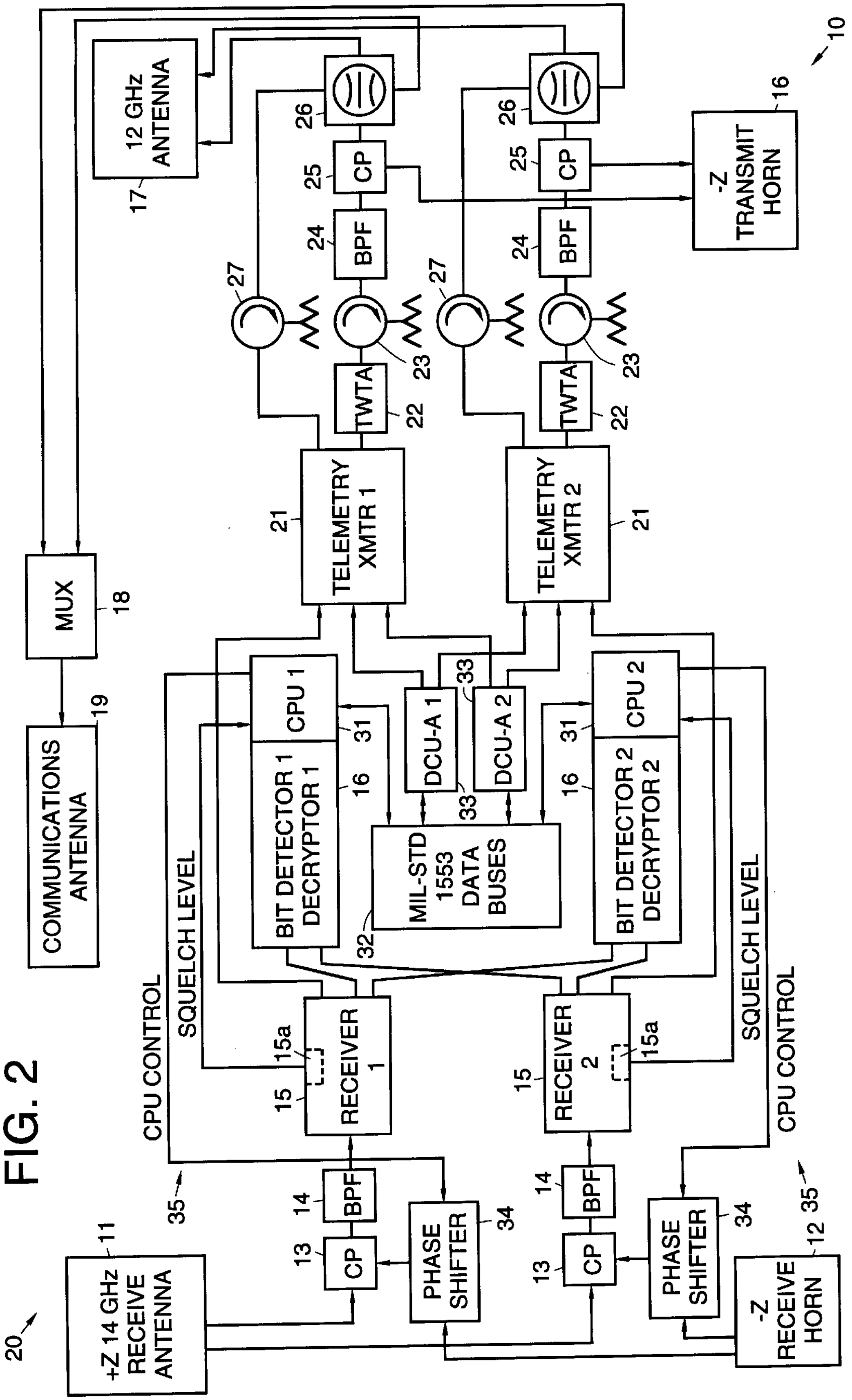
FIG. 2 illustrates a system in accordance with the principles of the present invention that eliminates nulls created by the antennas.

FIG. 2 illustrates a system 20 in accordance with the principles of the present invention that eliminates nulls created by the antennas 11, 12 on the spacecraft 10. In the system 20, RF signals derived from the +Z and −Z antennas 11, 12 are processed by redundant processing paths, one of which will be described below. The +Z antenna 11 comprises a 14 GHz broadbeam receive antenna 11. The −Z antenna 12 comprises a receive horn antenna 12. The particular antenna type is not limited to those specified in this example. This patent covers all applications where antenna beams overlap and cause an RF cancellation or reduction in power resulting from the summing of 2 received.

The +Z antenna 11 is coupled by way of a coupler (CP) 13 and a bandpass filter 14 to the receiver 15. A coupler 13 is used instead of a hybrid so that there will be lower loss through the +Z path because its signal is weaker as a result of the larger antenna pattern of the +Z antenna 11. The output of the receiver 15 is coupled to a bit detector and decryptor 16 which is coupled to and controlled by a central processing unit (CPU) 31 or processor 31. The CPU 31 is coupled by way of a MIL-STD 1553 bus 32 to a data concentration unit (DCU-A) 33. The output of the DCU-A 33 is coupled to a telemetry transmitter 21. The RF output of the telemetry transmitter 21 is amplified by a traveling wave tube amplifier (TWTA) 22 and is sent through a circulator 23, a bandpass filter 24 and a coupler 25. One output of the coupler 25 is coupled by way of a switch 26 to a 12 GHz broadbeam transmit antenna 17. The telemetry transmitter 21 has a second output that is coupled by way of a second circulator 27 to an alternate position of the switch 26. A second output of the coupler 25 is coupled to a −Z transmit horn antenna 16. A second position of the switch 26 is coupled by way of a multiplexer 18 to a communications antenna 19.

In accordance with the present invention, the CPU 31 is coupled to the receiver 15 and receives a squelch level signal from a squelch circuit 15*a* therein. Alternatively, a RF power monitor 15*a* may be used in place of the squelch circuit 15*a*. The CPU 31 measures the squelch level signal. The CPU 31 is coupled to a phase shifter 34 that is connected between the −Z receive horn antenna 12 and the coupler 13. The CPU 31 outputs a control signal to the phase shifter 34 that changes the phase generated by the phase shifter 34 in accordance with a predetermined algorithm, and which is added to or subtracted from the phase of the RF signal derived from the −Z receive horn antenna 12. Thus, a feedback loop 35 is formed from the receiver 15 through the CPU 31 to the phase shifter 34 which is used to shift the phase of the signals received by the −Z receive horn antenna 12 so that the occurrence of antenna nulls is eliminated.

The phase shifter 34 is preferably a computer controlled ferrite phase shifter 34 that is disposed in the path between the −Z receive horn antenna 12 and the coupler 13. A ferrite phase shifter 34 is used because of its low loss and fast response. However, it is to be understood that any phase shifter 34 may be employed and the present invention is not limited to only ferrite phase shifters 34. Also, the present invention may be implemented using a two step (180 degree) phase shifter 34 or a continuously variable phase shifter 34.

The algorithm that operates the phase shifter 34 is programmed into the CPU 31 and is activated when the squelch level of the receiver 15 is approached (such as when a predetermined threshold level is reached), indicating that the RF signal processed by the receiver 15 is about ready to drop out. This initiates an optimization algorithm in the CPU 31 that controls the phase of the RF signal derived from the −Z receiver horn antenna 12 that is input to the coupler 13.

Irrespective of the type of phase shifter 34 that is employed, the squelch level of the receiver 15 is measured before and after the phase is changed. The RF signal output from the receiver 15 is selected that generates the largest squelch level signal. If the new squelch level is larger than the initial squelch level, the new squelch level is maintained until it drops to the threshold level. If the new squelch level is lower than the initial squelch level, the phase shift supplied by the phase shifter 34 is changed in the opposite direction.

Thus, a system that eliminates nulls created by oppositely facing antennas on a spacecraft and thus eliminates loss of control of the spacecraft has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A system that eliminates nulls created by oppositely pointing first and second antennas on a spacecraft, said system comprising:

a coupler having a first input directly coupled to the first antenna;

a controllable phase shifter coupled between the second antenna and a second input of the coupler;

a receiver coupled to an output of the coupler; and a processor coupled to the receiver for receiving a squelch level signal therefrom, and coupled to the controllable phase shifter for providing a control signal thereto that changes the phase of the RF signal derived from the second antenna to maximize the squelch level signal so that the occurrence of antenna nulls is eliminated.

2. The system of claim 1 wherein the processor measures the squelch level before and after the phase shift is changed, and the RF signal is selected that generates the largest squelch signal, and wherein if the new squelch level is larger than the initial squelch level, the new squelch level is maintained until it drops to the threshold level, and if the new squelch level is lower, the phase shift supplied by the phase shifter is changed in the opposite direction to cause the squelch level to increase.

3. The system of claim 1 wherein the first antenna comprises a broadbeam receive antenna and the second antenna comprises a receive horn antenna.

4. The system of claim 1 wherein the phase shifter comprises a computer controlled ferrite phase shifter.

5. The system of claim 1 wherein the phase shifter comprises a 180 degree phase shifter.

6. The system of claim 1 wherein the phase shifter comprises a continuously variable phase shifter.

7. The system of claim 1 wherein the phase shifter comprises an incrementally variable phase shifter.

* * * * *